May 21, 1963 F. H. RAYMOND 3,090,880
ELECTRICAL ROTATING MACHINES
Filed Oct. 21, 1957
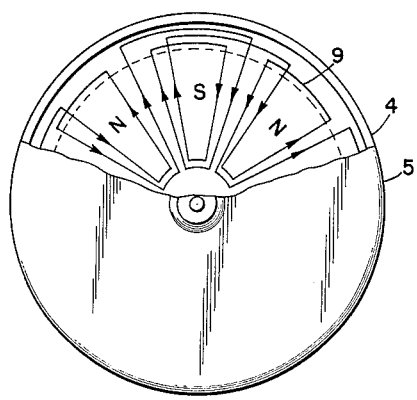
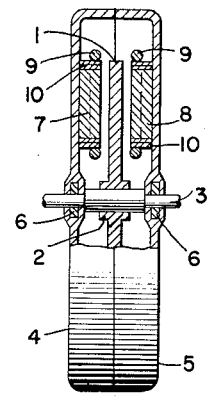
Fig. 2. Fig. 1.
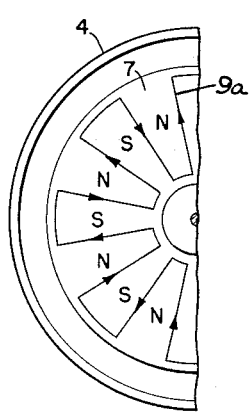
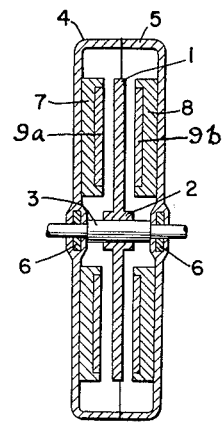
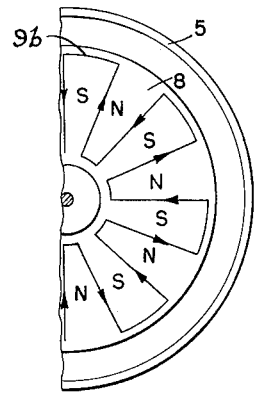
Fig. 4. Fig. 3. Fig. 5.
INVENTOR
FRANCOIS H. RAYMOND
BY
ATTORNEYS

United States Patent Office 3,090,880
Patented May 21, 1963

3,090,880
ELECTRICAL ROTATING MACHINES
Francois Henri Raymond, Saint-Germain-en-Laye, France, assignor, by mesne assignments, to Printed Motors, Inc., New York, N.Y.
Filed Oct. 21, 1957, Ser. No. 691,434
Claims priority, application France Nov. 7, 1956
14 Claims. (Cl. 310—268)

The present invention concerns improvements in or relating to electrical rotating machines, such as motors and generators, for alternating as well as direct current, and of medium or relatively low power.

It is an object of the invention to provide structural arrangements for such rotating machines presenting high electrical efficiency while being economical in manufacture and reduced in volume and current as compared to electrical power.

Another object of the invention is a rotating electrical machine having a large number of electrical poles in spite of reduced volume and, in contrast to small rotating machines of conventional design, efficient air-cooled through natural or forced ventilation.

A more specific object of the invention is to provide in a multipolar rotating electrical machine at least one discoidal stator member and at least one discoidal rotor member cooperating through an air-gap substantially of the same discoidal shape, at least one of these members including magnetic material and at least one of the members having at least one electrical winding distributed over an annular surface with its electrical conductors extending mostly radially with respect to such surface.

According to a further object of the invention, such radial winding consists of printed conductors, preferably level with their supporting surface of insulating, conducting or magnetic material, or any combination thereof.

For certain uses as A.C. machines, as another object of the invention the stator member may comprise at least one electrical winding of substantially rectangular sectorial turns.

As a more specific object of the invention, the stator member consists of two parts arranged on opposite sides of a magnetic rotor disc, with corresponding windings which in the case of a two-phase machine are displaced relative to each other by one-half the pole spacing.

For A.C. or D.C. applications, the stator member may comprise at least one set of magnetic polar areas distributed around the annular surface of a stator disc, facing an electrical winding of identical annular surface formed over a disc-shaped rotor member.

In both cases, a disc-shaped member of magnetic material is associated with the side of the rotor member opposite the side cooperating with the active part of the stator; such magnetic disc being either fixed, as a stator element, or joined mechanically with the active rotor member, depending on whether or not the rotor member is to possess very small inertia which is not always necessary.

These and other objects of the invention will be more fully disclosed with reference to the accompanying drawings.

FIG. 1 and FIG. 2 illustrate an embodiment of the invention as applied to an A.C. machine, FIG. 1 presenting a partial cross-section and FIG. 2 a partial plane view of the stator member.

FIGS. 3 to 5 illustrate another embodiment of an A.C. machine, FIG. 3 presenting a cross-section along the axis of the machine and FIGS. 4 and 5, respectively, being half-views of the corresponding stator members located on opposite sides of the rotor.

FIGS. 1 to 5 relate to an A.C. machine in which rotor member 1 consists only of a thin disc journalled at 2 on shaft 3. The stator part comprises two members attached, respectively, to half-casings 4 and 5, which also support bearings 6 for shaft 3. The stator consists of two annular rings 7 and 8 of magnetic material. The machine is of the multipolar type comprising for example eight poles per electrical phase, viz. eight poles for a single-phase machine and sixteen for a two-phase machine.

Magnetic rings 7 and 8 of FIG. 1 are provided with radial slots formed or machined therein to receive the electrical conductors of windings 9, shaped and distributed as readily apparent from the diagram of FIG. 2. Since in this case the winding process is conventional, no further explanation is required.

The two halves of windings 9 are applied to the two parts of the stator and are substantially identical. For a single-phase machine, windings 9 on opposite sides of rotor 1 are arranged with their North and South poles in register. A magnetic ribbon 10 may be wrapped around the outer edge of each of the annular magnetic cores 7 and 8 to form a toroid of laminations parallel to the lines of magnetic flux. A similar laminated toroid may be provided at the inner edge of cores 7 and 8, as shown in FIG. 1.

Alternatively, stator cores 7 and 8 may be made of sintered iron powder or the like, the radial slots being molded and the laminated wrapping omitted from the structure.

More advantageously, the winding conductors are formed by any suitable so-called "printing" process, because, as is well known, a printed conductor of definite cross-section will carry a substantially larger electrical current than a conventional "free" conductor. This is due to the fact that a printed conductor is a relatively thin, flat conductor, intimately secured or bonded throughout its length to an insulating supporting surface. Consequently, in electrical rotating machines according to the invention, the use of printed windings will permit a reduction in volume of the machine for a given electrical power. Furthermore, due to the flat and annular shape of the air-gaps, ventilation and cooling of these machines will be better than for machines of conventional design because of increased heat dissipation.

Since printed windings may now be obtained from known techniues with very thin and flat closely spaced conductors, there will be no difficulty in manufacturing windings such as here illustrated.

For instance windings 9 of FIGS. 3 to 5 are obtained in this way by printing. Each of stator halves 7, 8 carries such a winding, which are identical in shape and other electrical characteristics.

As apparent from FIGS. 4 and 5, however, the two stator windings 9a and 9b are shifted angularly with respect to each other about the axis of shaft 3 by one-half pole spacing for two-phase operation. The advantages of such an arrangement lie in its electrical power and simplicity of manufacture. In such a two-phase arrangement, the effective surface covered by each winding equals two-thirds of the surface of the air-gap while in conventionally designed two-phase machines, the corresponding effective surface amounts to only one-third of the air-gap surface. Furthermore, there is no need to interleave or overlap the two phases.

Each winding is shown to consist of a single-layer coil of substantially rectangularly shaped turns which may correspond to the shape actually used in practice. It is apparent that printing techniques permit each winding to be made up of a plurality of flat single-layer solenoids, serially interconnected by means of conducting bridges passing through or around the supporting element in order to establish interconnections between solenoids on the back of the support.

Since in practice the air-gaps must be as narrow as possible, it is of advantage to provide any winding supporting element of the machine with a smooth surface. For windings having relatively widely spaced turns, the conductors may be supported in suitable slots or grooves of the supporting plate of magnetic or other material. For closely spaced winding turns where the printed circuit is formed on a flat single-plane (without grooves or slots) surface, the overall surface of the winding may be smoothened by a filler of suitable material, for example magnetic material in the embodiment concerned. Such smoothing may be obtained for example by depositing colloidal iron over the entire surface carrying the printed winding; after this deposit has been dried, the surface is sanded or ground to expose the bare surfaces of the printed conductors. If required, as when a printed winding is to be applied to a metallic surface, an insulating film may be applied in any known manner, over the surface which is to receive the winding.

In case a single member is to be provided with several separate windings, the well-known "sandwich" technique of printed circuitry may be used by printing a first winding over a supporting plate, depositing thereon an insulating film, making a second print, and so forth. The resulting efficiency, of course, of such a composite structure is slightly reduced.

In embodiments such as shown in FIGS. 1 to 5, the rotor 1 of the machine need only consist of a thin disc of a material such as soft steel (for torque-driven motors) or hysteretic steel (for auto-synchronous motors). Alternatives include a disc of composite material combining copper and iron (obtained for example by sintering of powders) or a disc of magnetic material coated on both faces with conducting material.

In other embodiments, the rotor will carry at least one winding, preferably made in printed circuit technique as explained above with respect to the stator members of the embodiments previously described.

In the first two embodiments of the invention, the stator part of the machine has been shown to consist of a pair of wound stator members arranged on opposite sides of the rotor. Such an arrangement, however, is not absolutely necessary. More specifically, one of the stator members need not be wound and may consist of a plate or disc of magnetic material which merely serves to close the lines of flux traversing the rotor and therefore may be made part of the rotor. In cases, for instance, as described above, the rotor consists of a disc of magnetic material, this will merely require increasing the thickness of the disc sufficiently to close the lines of magnetic flux. In case the rotor includes a winding on a non-magnetic support, a magnetic disc of suitable thickness is mechanically attached to the rotor structure proper.

I claim:

1. In a multipolar rotating electric machine, the combination of a disk-shaped rotor structure having a flat annular surface on one face thereof concentric with the axis of the rotor, a disk-shaped stator structure arranged on a common axis with said rotor structure and having a continuous single-plane annular surface facing the flat annular surface of said rotor structure, said annular surfaces being spaced apart to provide a planar air-gap between said structures, an electric winding mounted on said single-plane surface and comprising a plurality of flat conductors intimately secured to said single-plane surface and being angularly spaced about said common axis throughout the extent of said single-plane annular surface, a deposit of electrically insulating magnetic filler material bonded to the supporting surface of said winding and filling the gaps between said conductors to a depth flush with the outer faces of said flat conductors, said conductors being connected together in a closed winding to form an even number of magnetic poles spaced apart around said single-plane annular surface, alternate poles being of opposite polarity, and magnetic means located on the opposite side of said air-gap from said winding for closing the magnetic fields of said poles through said air-gap.

2. Rotating electric machine according to claim 1 wherein said deposit is constituted by particles of a magnetic material bonded together by a dielectric binder.

3. Rotating electric machine according to claim 1 wherein said rotor embodies a conducting ring in which eddy currents can circulate.

4. Rotating electric machine according to claim 3 wherein the material of said ring is chosen from copper, iron and aluminum.

5. A machine according to claim 1 wherein said stator comprises a ring of magnetic material carrying at its inner and outer boundaries windings of a strip of magnetic material.

6. An electric machine according to claim 1 wherein said rotor is sandwiched between two stators carrying windings of identical design, each winding being fastened on a ring of magnetic material.

7. In a rotating electric machine, the combination of a disk-shaped rotor element, a pair of disk-shaped stator elements arranged on a common axis with said rotor element and located on opposite sides of said rotor element, each stator element having a flat single-plane annular surface facing said rotor element, a flat electric winding mounted on each stator element and covering the complete annular area available on the stator element, each winding forming a plurality of magnetic poles spaced apart in an annular portion of each stator element, alternate poles being of opposite polarity, and the poles on one stator element being spaced angularly about said common axis by one-half the pole spacing with respect to the poles on the other stator element.

8. An electric machine according to claim 7 wherein the rotor is formed of a disc of a material at least partially magnetic.

9. An electric machine according to claim 7 wherein the rotor is formed of hysteretic steel.

10. An electric machine according to claim 7 wherein the rotor is formed of an intimate mixture of iron and copper.

11. An electric machine according to claim 7 wherein the rotor is formed of a magnetic disc covered on its two faces with a conducting layer.

12. A winding element for an axial-airgap electric machine comprising a winding-carrier formed of a disc-shaped member of magnetic material having on one radial face thereof an annular area having an insulating single-plane surface, and a conductive winding carried on said annular area comprising flat conductor portions arranged generally radially of said annular area and intimately bonded to said insulating surface, said radial conductor portions having their ends joined by circumferential portions to form a closed circuit winding for establishing a number of pole areas equally distributed about the circumference of said annular area, said radial portions being spaced apart circumferentially of said annular area to provide insulating gaps between adjacent portions, and a deposit of electrically insulating magnetic filler material bonded to said insulating surface and filling the gaps between said radial conductor portions to a depth flush with the outer faces of said flat conductor portions.

13. A winding element according to claim 12 wherein said magnetic filler material comprises the dried and hardened residue of colloidal iron.

14. In a multipolar rotating electric machine, the combination of a disk-shaped rotor structure having a flat annular surface on one face thereof concentric with the axis of the rotor, a disk-shaped stator structure arranged on a common axis with said rotor structure and having a continuous single-plane annular surface facing the flat annular surface of said rotor structure, said annular surfaces being spaced apart to provide a planar air-gap between said structures, an electric winding mounted on said single plane surface and comprising a plurality of flat printed-circuit conductors intimately secured to said single plane surface and being angularly spaced about said common axis throughout the extent of said single-plane annular surface, said disk-shaped stator being formed of magnetic material and said flat printed-circuit conductors being very thin and substantially flush with the surface of said magnetic stator, said conductors being connected together in a closed winding to form an even number of magnetic poles spaced apart around said single-plane annular surface, alternate poles being of opposite polarity, and magnetic means located on the opposite side of said air-gap from said winding for closing the magnetic fields of said poles through said air-gap.

References Cited in the file of this patent

UNITED STATES PATENTS

| | | |
|---|---|---|
| 286,247 | Wolcott | Oct. 9, 1883 |
| 290,199 | Ball | Dec. 18, 1883 |
| 295,534 | Frick | Mar. 25, 1884 |
| 333,174 | Thomson | Dec. 29, 1885 |
| 570,914 | Dorman | Nov. 10, 1896 |
| 685,313 | White | Oct. 29, 1901 |
| 2,441,960 | Eisler | May 25, 1948 |
| 2,469,808 | Aske | May 10, 1949 |
| 2,550,571 | Litman | Apr. 24, 1951 |
| 2,734,140 | Parker | Feb. 7, 1956 |
| 2,758,231 | Welter | Aug. 7, 1956 |
| 2,773,239 | Parker | Dec. 4, 1956 |